(12) United States Patent
Chai et al.

(10) Patent No.: US 10,392,464 B2
(45) Date of Patent: Aug. 27, 2019

(54) THERMOPLASTIC RESIN, METHOD OF PREPARING THERMOPLASTIC RESIN, AND THERMOPLASTIC RESIN COMPOSITION INCLUDING THERMOPLASTIC RESIN

(71) Applicant: LG CHEM, LTD., Seoul (KR)

(72) Inventors: Joo Byung Chai, Daejeon (KR); Yu Sung Jung, Daejeon (KR); Eun Seon Park, Daejeon (KR); Tae Young Jeon, Daejeon (KR); Young Min Kim, Daejeon (KR); Jong Beom Kim, Daejeon (KR); Chang Sull Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 2 days.

(21) Appl. No.: 15/548,999

(22) PCT Filed: Nov. 22, 2016

(86) PCT No.: PCT/KR2016/013500
§ 371 (c)(1),
(2) Date: Aug. 4, 2017

(87) PCT Pub. No.: WO2017/095059
PCT Pub. Date: Jun. 8, 2017

(65) Prior Publication Data
US 2018/0030191 A1    Feb. 1, 2018

(30) Foreign Application Priority Data

Dec. 1, 2015 (KR) .................. 10-2015-0169658

(51) Int. Cl.
*C08F 279/04* (2006.01)
*C08L 25/12* (2006.01)
*C08L 51/04* (2006.01)
*C08L 25/16* (2006.01)

(52) U.S. Cl.
CPC .......... *C08F 279/04* (2013.01); *C08L 25/12* (2013.01); *C08L 25/16* (2013.01); *C08L 51/04* (2013.01); *C08L 2201/08* (2013.01); *C08L 2207/53* (2013.01)

(58) Field of Classification Search
CPC .................. C08L 55/02; C08L 2207/53
See application file for complete search history.

(56) References Cited

U.S. PATENT DOCUMENTS

| 4,393,172 A | 7/1983 | Lindner et al. |
| 4,510,287 A | 4/1985 | Wu |
| 5,188,751 A * | 2/1993 | Takaki .................. C08L 27/06 525/239 |
| 2004/0192843 A1 | 9/2004 | Chai et al. |
| 2006/0089462 A1 | 4/2006 | O et al. |
| 2006/0211817 A1 | 9/2006 | Cha et al. |

FOREIGN PATENT DOCUMENTS

| CN | 1376171 A | 10/2002 |
| CN | 1394216 A | 1/2003 |
| CN | 1487961 A | 4/2004 |
| CN | 1768111 A | 5/2006 |
| JP | 2004514001 A | 5/2004 |
| JP | 2005509702 A | 4/2005 |
| JP | 2006522838 A | 10/2006 |
| KR | 10-2006-0119255 A | 11/2006 |
| KR | 10-0717515 B1 | 5/2007 |
| KR | 1020140147319 A | 12/2014 |
| WO | WO 2014/204071 A1 | 12/2014 |

OTHER PUBLICATIONS

Lee et al., electronic translation of KR 10-2006-0119255, Nov. 2006.*
Office Action from Chinese Patent Office for Application No. 201680012169.6, dated Dec. 27, 2018.
Extended European Search Report for 16870955.8 dated Sep. 27, 2018.
International Search Report issued in related PCT Application No. PCT/KR2016/013500 dated Feb. 21, 2017.

* cited by examiner

*Primary Examiner* — Jeffrey C Mullis

(57) ABSTRACT

The present invention relates to a thermoplastic resin, a method of preparing the thermoplastic resin, and a thermoplastic resin composition including the thermoplastic resin. More particularly, the present invention relates to a thermoplastic resin characterized by maximizing a ratio of monomers grafted to rubber particles and a graft rate so as to maintain a rubber particle shape in a high shear environment and varying the composition of each of monomers grafted to the inside and outside of rubber particles, a method of preparing the thermoplastic resin, and a thermoplastic resin composition having superior impact strength, falling dart impact strength, heat deflection temperature, chemical resistance, and plating adhesion strength due to inclusion of the thermoplastic resin.

14 Claims, 1 Drawing Sheet

THERMOPLASTIC RESIN, METHOD OF PREPARING THERMOPLASTIC RESIN, AND THERMOPLASTIC RESIN COMPOSITION INCLUDING THERMOPLASTIC RESIN

TECHNICAL FIELD

This application is a U.S. National Stage of PCT/KR2016/013500 filed Nov. 22, 2016, which claims the priority benefit of Korean Patent Application No. 10-2015-0169658, filed on Dec. 1, 2015 in the Korean Intellectual Property Office, the disclosures of which are incorporated herein by reference.

The present invention relates to a thermoplastic resin, a method of preparing the thermoplastic resin, and a thermoplastic resin composition including the thermoplastic resin. More particularly, the present invention relates to a thermoplastic resin characterized by maximizing a ratio of monomers grafted to rubber particles and a graft rate so as to maintain a rubber particle shape in a high shear environment and varying the composition of each of monomers grafted to the inside and outside of rubber particles, a method of preparing the thermoplastic resin, and a thermoplastic resin composition having superior impact strength, falling dart impact strength, heat deflection temperature, chemical resistance, and plating adhesion strength due to inclusion of the thermoplastic resin.

BACKGROUND ART

Acrylonitrile-butadiene-styrene (hereinafter referred to as "ABS") resin is widely used in automotive products, electrical and electronic products, office equipment, and the like due to stiffness and chemical resistance of acrylonitrile and processability, mechanical strength and aesthetically pleasing appearance of butadiene and styrene.

ABS resin, which is generally prepared by emulsion polymerization, may be used as a general, flame retardant, extruded, heat-resistant, or transparent material, or the like depending upon the properties of a mixed matrix resin. More particularly, ABS resin may be used as a special material such as a material for plating or painting. Especially, in the case of a material for plating, rubber particles included in ABS resin are removed by chemical etching to form anchor holes. The formed anchor holes are plated with a metallic plating film. Here, plating adhesion, which is one of important properties, is determined by the shape of formed anchor holes, i.e., how well the shapes of removed rubber particles are maintained. However, the anchor holes may be deformed under a high shear condition, such as an injection molding process, and such deformed anchor holes may cause decrease in plating adhesion of a material for plating. In connection with this, research into reducing deformation of anchor holes using a method of increasing a gel content in rubber particles, a method of maximizing a graft rate of an ABS resin, etc. is underway. However, the method of increasing a gel content is inefficient because it directly causes decrease in graft efficiency of ABS resin and thus lowers dispersibility, etc. In addition, the method of maximizing a graft rate is disadvantageous in that chemical resistance is poor.

Therefore, there is a need for development of a material having both superior plating adhesion and chemical resistance by reducing deformability under the aforementioned high shear condition.

RELATED ART DOCUMENT

[Patent Document] [Patent Document 1] U.S. Pat. No. 4,510,287 A

DISCLOSURE

Technical Problem

Therefore, the present invention has been made in view of the above problems, and it is one object of the present invention to provide a thermoplastic resin characterized by maximizing a ratio of monomers grafted to rubber particles and a graft rate so as to maintain a rubber particle shape in a high shear environment and varying the composition of each of monomers grafted to the inside and outside of rubber particles.

It is another object of the present invention to provide a method of preparing the thermoplastic resin.

It is yet another object of the present invention to provide a thermoplastic resin composition having superior impact strength, falling dart impact strength, heat deflection temperature, chemical resistance, and plating adhesion strength due to inclusion of the thermoplastic resin.

The above and other objects can be accomplished by the present disclosure described below.

Technical Solution

In accordance with one aspect of the present invention, provided is a thermoplastic resin including a core prepared by graft-polymerizing 40 to 70% by weight of a conjugated diene rubbery polymer with 7.5 to 30% by weight of a total of monomers including an aromatic vinyl compound and a vinyl cyanide compound; and a shell enclosing the core and prepared by graft-polymerizing the conjugated diene rubbery polymer with 15 to 45% by weight of a total of monomers including an aromatic vinyl compound and a vinyl cyanide compound, wherein the vinyl cyanide compound of the monomers constituting the core is included in an amount of 0.01 to 20% by weight based on 100% by weight of a total of the monomers of the core, and the vinyl cyanide compound of the monomers constituting the shell is included in an amount of greater than 25% by weight to 90% by weight or less based on 100% by weight of a total of the monomers of the shell.

In accordance with another aspect of the present invention, there is provided a method of preparing a thermoplastic resin, the method includes i) a step of performing graft polymerization by adding 40 to 70% by weight of a conjugated diene rubbery polymer and 7.5 to 30% by weight of a total of monomers including an aromatic vinyl compound and a vinyl cyanide compound batchwise; and ii) a step of performing graft polymerization by continuously adding 15 to 45% by weight of a total of monomers including an aromatic vinyl compound and a vinyl cyanide compound, wherein the vinyl cyanide compound added batchwise in step i) is included in an amount of 20% by weight or less based on 100% by weight of a total of the monomers added batchwise, and the vinyl cyanide compound continuously added in step ii) is included in an amount of greater than 25% by weight based on 100% by weight of the monomers continuously added.

In accordance with yet another aspect of the present invention, there is provided a thermoplastic resin composition including the thermoplastic resin and a heat-resistant monomer-vinyl cyanide compound copolymer.

Advantageous Effects

As apparent from the fore-going, the present invention advantageously provides a thermoplastic resin characterized by maximizing a ratio of monomers grafted to rubber particles and a graft rate so as to maintain a rubber particle shape in a high shear environment and varying the composition of each of monomers grafted to the inside and outside of rubber particles, a method of preparing the thermoplastic resin, and a thermoplastic resin composition having superior impact strength, falling dart impact strength, heat deflection temperature, chemical resistance, and plating adhesion strength due to inclusion of the thermoplastic resin.

BEST MODE

Figure 1:
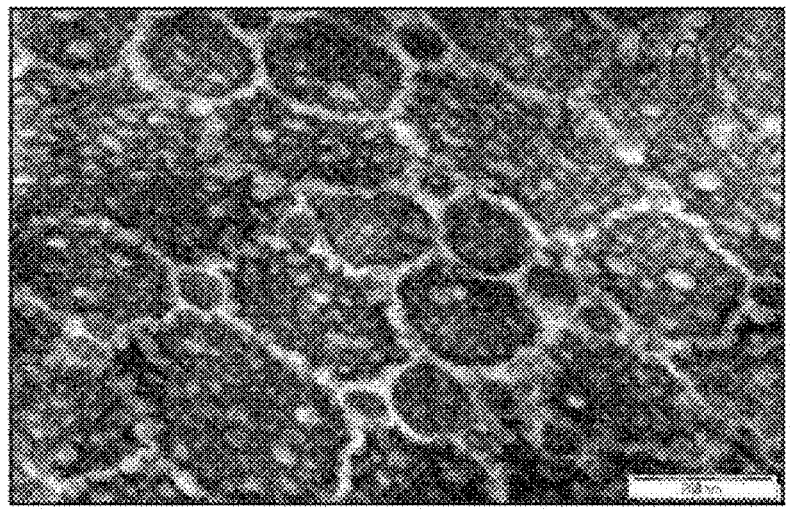
FIG. 1 illustrates a 150× magnification image of a thermoplastic resin according to Example 1 of the present invention captured by a transmission electron microscope (TEM).
Figure 2:
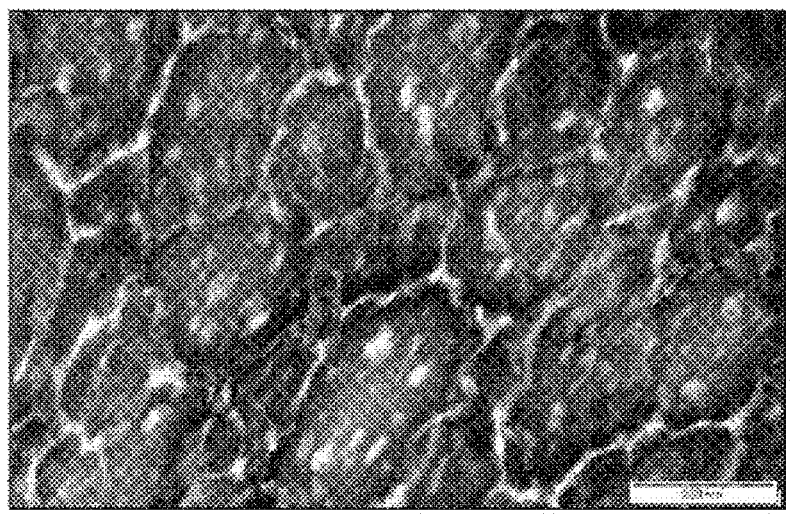
FIG. 2 illustrates a 150× magnification image of a thermoplastic resin according to Comparative Example 1 of the present invention captured by a transmission electron microscope (TEM).

Hereinafter, the present invention is described in detail.

The present inventors confirmed that, when a graft rate is maximized by controlling the composition of each of monomers grafted to the inside and outside of rubber particles within a specific range so as to prepare a thermoplastic resin, both mechanical properties and plating adhesion strength of a thermoplastic resin composition including the thermoplastic resin are improved, thus completing the present invention.

Hereinafter, the thermoplastic resin according to the present invention is described in detail.

The thermoplastic resin includes a core prepared by graft-polymerizing 40 to 70% by weight of a conjugated diene rubbery polymer with 7.5 to 30% by weight of a total of monomers including an aromatic vinyl compound and a vinyl cyanide compound; and a shell enclosing the core and prepared by graft-polymerizing the conjugated diene rubbery polymer with 15 to 45% by weight of a total of monomers including an aromatic vinyl compound and a vinyl cyanide compound, wherein the vinyl cyanide compound of the monomers constituting the core is included in an amount of 0.01 to 20% by weight based on 100% by weight of a total of the monomers of the core, and the vinyl cyanide compound of the monomers constituting the shell is included in an amount of greater than 25% by weight to 90% by weight or less based on 100% by weight of a total of the monomers of the shell.

The monomers constituting the core, for example, may be graft-polymerized to the inside of the conjugated diene rubbery polymer, and the monomers constituting the shell, for example, may enclose the core and may be graft-polymerized to the outside of the conjugated diene rubbery polymer.

The thermoplastic resin may include, for example, a core prepared by graft-polymerizing 40 to 70% by weight of a conjugated diene rubbery polymer and 7.5 to 30% by weight of a total of monomers including an aromatic vinyl compound and a vinyl cyanide compound to the inside of the conjugated diene rubbery polymer; and a shell enclosing the core and prepared by graft-polymerizing 15 to 45% by weight of a total of monomers including an aromatic vinyl compound and a vinyl cyanide compound to the outside of the conjugated diene rubbery polymer, wherein the vinyl cyanide compound of the monomers constituting the core is included in an amount of 20% by weight or less based on 100% by weight of a total of the monomers of the core, the vinyl cyanide compound of the monomers constituting the shell is included in an amount of greater than 25% by weight based on 100% by weight of a total of the monomers of the shell. Graft polymerization positions of the core graft-polymerized to the inside of the conjugated diene rubbery polymer and the shell graft-polymerized to the outside of the conjugated diene rubbery polymer may be determined by, for example, the content of each of the monomers, an initiator, and a molecular weight regulator, and may be investigated by means of a transmission electron microscope (TEM).

The conjugated diene rubbery polymer may be, for example, a mixture of two or more conjugated diene rubbery polymers having different gel contents. As a particular example, the conjugated diene rubbery polymer may be a mixture of a rubbery polymer (A) having a gel content of 60 to 75% by weight or 65 to 70% by weight and a rubbery polymer (B) having a gel content of 80 to 95% by weight or to 90% by weight. In this case, swelling of the conjugated diene rubbery polymer is maximized, and thus, a graft fraction of the core is increased. Accordingly, a rubber particle shape is maintained in high shear environment, whereby superior plating adhesion and falling dart impact strength are exhibited.

A total weight-average particle diameter of the rubbery polymer (A) may be, for example, 2,900 to 3,300 Å, or 3,000 to 3,200 Å, and a total weight-average particle diameter of the rubbery polymer (B) may be, for example, 3,000 to 4,000 Å, or 3,100 to 3,500 Å. Within these ranges, swelling of the conjugated diene rubbery polymer is maximized, and thus, a graft fraction of the core is increased.

Accordingly, a rubber particle shape is maintained in high shear environment, whereby superior plating adhesion and falling dart impact strength are exhibited.

25% by weight of the rubbery polymer (A) may have, for example, a weight-average particle diameter of 2,400 to 2,800 Å, or 2,500 to 2,700 Å. Within this range, a ratio of particles having very small diameters in a rubbery polymer is limited, whereby superior mechanical properties are exhibited.

25% by weight of the rubbery polymer (B) may have, for example, a weight-average particle diameter of 2,500 to 2,900 Å, or 2,600 to 2,800 Å. Within this range, a ratio of particles having very small diameters in a rubbery polymer is limited, whereby superior mechanical properties are exhibited.

A weight ratio (A:B) of the rubbery polymer (A) to the rubbery polymer (B) may be, for example, 50:50 to 99.9:0.1, 60:40 to 90:10, or 65:35 to 85:15. Within this range, a core may be easily graft-polymerized, whereby a rubber particle shape is easily maintained during etching in a plating process and dispersibility of rubber particles is superior. Accordingly, superior falling dart impact strength is exhibited.

In the thermoplastic resin, a total graft rate of the core and the shell may be, for example, 50 to 85%, or 55 to 80%. Within this range, a rubber particle shape is maintained in high shear environment.

A graft fraction of the core may be, for example, 45 to 85%, 50 to 80%, or 55 to 80% based on a total graft rate of the core and the shell. Within this range, a rubber particle shape is easily maintained during etching in a plating process and dispersibility of rubber particles is superior. Accordingly, superior falling dart impact strength is exhibited.

The conjugated diene rubbery polymer may be prepared by polymerizing, for example, one or more selected from the group consisting of 1,3-butadiene, 2-methyl-1,3-butadiene, 2,3-dimethyl-1,3-butadiene, 2-ethyl-1,3-butadiene, 2,3-dimethyl-1,3-butadiene, 1,3-pentadiene, and chloroprene. As another example, the conjugated diene rubbery polymer may be in the form of a latex dispersed in water in a colloidal state.

The conjugated diene rubbery polymer may be included, for example, in an amount of 40 to 70% by weight, 50 to 70% by weight, or 50 to 60% by weight based on the thermoplastic resin. Within this range, superior mechanical properties and plating adhesion are exhibited.

The monomers of the core may be included, for example, in a total amount of 7.5 to 30% by weight, 10 to 30% by weight, or 10 to 20% by weight based on the thermoplastic resin. Within this range, heat generation is not excessive in an early stage of reaction, whereby polymerization stability and a graft rate are superior. Accordingly, superior mechanical properties and property balance are exhibited.

The vinyl cyanide compound of the monomers constituting the core may be included, for example, in an amount of 20% by weight or less, 0.1 to 20% by weight, or 10 to 20% by weight based on 100% by weight of a total of the monomers of the core. Within this range, softening of the conjugated diene rubbery polymer is maximally maintained although the monomers are graft-polymerized inside the core, whereby superior chemical resistance is exhibited.

The monomers constituting the shell may be included, for example, in a total amount of 15 to 45% by weight, 20 to 40% by weight, or 25 to 35% by weight based on the thermoplastic resin. Within this range, superior mechanical properties and property balance are exhibited.

The vinyl cyanide compound of the monomers constituting the shell may be included, for example, in an amount of greater than 25% by weight, greater than 25% by weight to 90% by weight or less, or 26 to 50% by weight based on 100% by weight of a total of the monomers of the shell. Within this range, compatibility of the thermoplastic resin composition to a matrix resin and dispersibility of the thermoplastic resin are excellent, whereby superior mechanical properties and property balance are exhibited.

The aromatic vinyl compound of the monomers constituting each of the core and shell may be, for example, one or more selected from the group consisting of styrene, α-methyl styrene, p-methyl styrene, o-ethyl styrene, p-ethyl styrene, and vinyl toluene.

The vinyl cyanide compound of the monomers constituting each of the core and shell may be, for example, one or more selected from the group consisting of acrylonitrile, methacrylonitrile, and ethacrylonitrile.

A method of preparing the thermoplastic resin according to the present invention includes i) a step of performing graft polymerization by adding 40 to 70% by weight of a conjugated diene rubbery polymer and 7.5 to 30% by weight of a total of monomers including an aromatic vinyl compound and a vinyl cyanide compound batchwise; and ii) a step of performing graft polymerization by continuously adding 15 to 45% by weight of a total of monomers including an aromatic vinyl compound and a vinyl cyanide compound, wherein the vinyl cyanide compound added batchwise in step i) is included in an amount of 20% by weight or less based on 100% by weight of a total of the monomers added batchwise, and the vinyl cyanide compound continuously added in step ii) is included in an amount of greater than 25% by weight based on 100% by weight of the monomers continuously added.

The graft polymerization of each of steps i) and ii) may be, for example, emulsion graft polymerization. In this case, mechanical properties are superior. The graft polymerization is not specifically limited so long as it is a general emulsion graft polymerization method.

When the graft polymerization of step i) is performed, for example, an emulsifier, a molecular weight regulator, and an initiator may be included.

The emulsifier of step i) may be, for example, a general adsorption-type emulsifier, a general reactive emulsifier, a general polymer-type reactive emulsifier, or a combination thereof, and may be included in an amount of 0 to 3 parts by weight, 0 to 1 part by weight, 0 to 0.5 parts by weight, or 0.1 to 0.5 parts by weight based on 100 parts by weight of a total of the conjugated diene rubbery polymer and the monomers added in steps i) and ii). Within this range, formation of a shell enclosing a core may be controlled, whereby graft polymerization to the conjugated diene rubbery polymer may be smoothly performed.

The molecular weight regulator of step i) is not specifically limited so long as it may be used in the graft polymerization. For example, the molecular weight regulator may be a mercaptan-based molecular weight regulator or a dimer-based molecular weight regulator. The dimer-based molecular weight regulator may be, for example, an α-methyl styrene dimer, and may be included in an amount of 0 to 0.3 parts by weight, or 0.1 to 0.2 parts by weight based on 100 parts by weight of a total of the conjugated diene rubbery polymer and the monomers added in steps i) and ii). Within this range, a weight-average molecular weight and a graft rate may be maintained within a proper range.

The initiator of step i) may be, for example, a hydroperoxide-based catalyst, an oxidoreductive catalyst, or a combination thereof. The hydroperoxide-based initiator may be, for example, a lipid-soluble hydroperoxide.

The monomers continuously added in step ii), for example, may be added simultaneously with initiation of the graft polymerization of step i). As another example, the monomers continuously added in step ii) may be added when a polymerization conversion rate of the graft polymerization of step i) is 30% or less, 20% or less, or 10 to 20%. In this case, a core and a graft shell may be smoothly formed and a side reaction due to heat generated during polymerization may be suppressed.

The monomers continuously added in step ii) may be added, for example, over 1 to 5 hours, 1 to 4 hours, or 1 to 3 hours from an addition time point of the monomers.

Step ii) may be performed, for example, under an isothermal condition under which a temperature change amount (ΔT) in a reactor is 2° C. or less, or 0.1 to 2 r. Within this range, graft polymerization of a core and graft polymerization of a shell may be smoothly carried out. The temperature change amount (ΔT) in a reactor refers to a difference between a setting temperature of the reaction and a real temperature inside the reactor.

In graft polymerization of step ii), for example, an emulsifier, a molecular weight regulator, and an initiator may be included.

The emulsifier of step ii) may be, for example, a general adsorption-type emulsifier, a general reactive emulsifier, a general polymer-type reactive emulsifier, or a combination thereof. The adsorption-type emulsifier may be, for example, a $C_{12}$ to $C_{18}$ saturated hydrocarbon-based emulsifier. The $C_{12}$ to $C_{18}$ saturated hydrocarbon-based emulsifier may be, for example, a saturated fatty acid-based emulsifier.

The emulsifier of step ii) may be included, for example, in an amount of 0.1 to 2 parts by weight, or 0.5 to 1.5 parts by weight based on 100 parts by weight of a total of the conjugated diene rubbery polymer and the monomers added in steps i) and ii). Within this range, the shell enclosing the core may be easily formed.

The molecular weight regulator of step ii) is not specifically limited so long as it may be used for the graft polymerization, and may be, for example, a mercaptan-based molecular weight regulator or a dimer-based molecular weight regulator. For example, the dimer-based molecular weight regulator may be an α-methyl styrene dimer and may be included in an amount of 0.001 to 0.5 parts by weight, or 0.01 to 0.4 parts by weight based on 100 parts by weight of a total of the conjugated diene rubbery polymer and the monomers added in steps i) and ii). Within this range, a weight-average molecular weight and a graft rate may be maintained within a proper range.

The initiator of step ii) may be, for example, a hydroperoxide-based catalyst, an oxidoreductive catalyst, or a combination thereof. For example, the hydroperoxide-based initiator may be a lipid-soluble hydroperoxide and may be included in an amount of 0.001 to 0.5 parts by weight, or 0.01 to 0.3 parts by weight based on 100 parts by weight of a total of the conjugated diene rubbery polymer and the monomers added in steps i) and ii).

When the continuous addition of step ii) is terminated, a polymerization conversion rate may be, for example, 90% or more, 90 to 99%, or 94 to 96%.

In the method of preparing the thermoplastic resin, for example, 0.01 to 0.3 parts by weight or 0.1 to 0.2 parts by weight of one or more selected from the group consisting of a hydroperoxide-based initiator, a thermal decomposition initiator, and an oxidoreductive initiator may be added batchwise in 1 to 5 batches or 1 to 3 batches at 60 to 100° C. or 70 to 90° C. for additional polymerization after termination of the continuous addition of step ii).

In the method of preparing the thermoplastic resin, for example, polymerization may be additionally performed for 30 minutes to 3 hours, or 1 to 2 hours after termination of the continuous addition of step ii) and after addition of the initiator. After completing the polymerization, a polymerization conversion rate may be, for example, 95% or more, 95 to 99.9%, or 98 to 99.9%.

The polymerized thermoplastic resin may be obtained, for example, in the form of a latex dispersed in water in a colloidal state.

By the graft polymerization of step i), for example, the monomers added batchwise may be graft-polymerized to the inside of the conjugated diene rubbery polymer, thereby preparing a core. In addition, by the graft polymerization of step ii), for example, the monomers continuously added may be graft-polymerized to the outside of the conjugated diene rubbery polymer, thereby preparing the shell enclosing the core.

Graft polymerization positions of the core graft-polymerized to the inside of the conjugated diene rubbery polymer and the shell graft-polymerized to the outside of the conjugated diene rubbery polymer may be determined, for example, by the content of each of the monomers added in steps i) and ii), an initiator, and a molecular weight regulator.

The method of preparing the thermoplastic resin may include, for example, a step of coagulating, aging, washing, or drying the resin latex obtained after completion of the polymerization.

A thermoplastic resin composition of the present invention is characterized by including the thermoplastic resin and an aromatic vinyl compound-vinyl cyanide compound copolymer.

The thermoplastic resin composition may have, for example, a shape wherein the graft copolymer is dispersed in a matrix resin composed of the aromatic vinyl compound-vinyl cyanide compound copolymer. In this case, impact strength and property balance are superior.

The aromatic vinyl compound constituting the aromatic vinyl compound-vinyl cyanide compound copolymer may be, for example, one or more selected from the group consisting of styrene, α-methyl styrene, p-methyl styrene, o-ethyl styrene, p-ethyl styrene, and vinyl toluene. Preferably, the aromatic vinyl compound may be α-methyl styrene. In this case, superior heat resistance and property balance are exhibited.

The aromatic vinyl compound may be included, for example, in an amount of 10 to 90% by weight, 30 to 80% by weight, or 50 to 80% by weight based on the aromatic vinyl compound-vinyl cyanide compound copolymer. Within this range, superior heat resistance and impact strength are exhibited.

The vinyl cyanide compound constituting the aromatic vinyl compound-vinyl cyanide compound copolymer may be, for example, one or more selected from the group consisting of acrylonitrile, methacrylonitrile, and ethacrylonitrile, and may be included in an amount of 10 to 90% by weight, 20 to 70% by weight, or 20 to 50% by weight based on the aromatic vinyl compound-vinyl cyanide compound copolymer. Within this range, superior mechanical properties and property balance are exhibited.

The aromatic vinyl compound-vinyl cyanide compound copolymer may be polymerized, for example, by solution polymerization. In this case, superior impact strength and heat resistance are exhibited.

The thermoplastic resin may be included, for example, in an amount of 10 to 50% by weight, 10 to 40% by weight, or 15 to 40% by weight based on the thermoplastic resin composition, and the aromatic vinyl compound-vinyl cyanide compound copolymer may be included, for example, in an amount of 50 to 90% by weight, 60 to 90% by weight, or 60 to 85% by weight based on the thermoplastic resin composition. Within this range, superior heat resistance, mechanical properties, and property balance are exhibited.

The thermoplastic resin composition may further include, for example, an additive, such as a heat stabilizer, a light stabilizer, an antioxidant, an antistatic agent, an antimicrobial agent, or a lubricant, within a range within which the properties of the thermoplastic resin composition are not affected.

The thermoplastic resin composition may have, for example, a falling dart impact strength of greater than 4,200 N, 4,300 to 5,000 N, or 4,400 to 4,800 N.

The thermoplastic resin composition may have, for example, a heat deflection temperature of greater than 100 r, 101 r or more, or 101 to 105 r.

The thermoplastic resin composition may have, for example, a chemical resistance of 20 min or more, 30 to 120 min, or 50 to 90 min.

The thermoplastic resin composition may have a plating adhesion strength of greater than 11.6 N/m, 12 to 15 N/m, or 12.1 to 13.5 N/m.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Example 1

Preparation of Thermoplastic Resin
Batch Input Step (S1)

100 parts by weight of ion exchanged water; 35 parts by weight (based on a solid) of a polybutadiene latex (PBL A), a total weight-average particle diameter of which was of 3,200 Å, 25% by weight of which had a weight-average particle diameter of 2,700 Å, and which had a gel content of 70% by weight; and 20 parts by weight (based on a solid) of polybutadiene latex (PBL B) which had a total weight-average particle diameter of 3,300 Å, 25% by weight of which had a weight-average particle diameter of 2,800 Å, and which had a gel content of 90% by weight were fed batchwise into a nitrogen-substituted polymerization reactor. Subsequently, 15 parts by weight of a total of styrene and acrylonitrile monomers (an acrylonitrile content in the monomers was 10% by weight), 0.2 parts by weight of potassium stearate, 0.1 parts by weight of tertiary dodecyl mercaptan, and 0.3 parts by weight of t-butyl hydroperoxide were sequentially fed into the reactor batchwise, followed by stirring at 50 r for 30 minutes. Subsequently, an oxidoreductive catalyst composed of 0.035 parts by weight of dextrose, 0.06 parts by weight of sodium pyrophosphate, and 0.0015 parts by weight of ferrous sulfate was fed into the reactor batchwise, and polymerization was performed while elevating temperature to 70° C. over the course of one hour.

Continuous Addition Step (S2)

An emulsion including 100 parts by weight of ion exchanged water, 30 parts by weight of a total of styrene and acrylonitrile monomers in (an acrylonitrile content in the monomers was 32.5% by weight), 1 part by weight of potassium stearate, 0.1 parts by weight of tertiary dodecyl mercaptan, and 0.1 parts by weight of cumene hydroperoxide were continuously added for 2 hours 30 minutes simultaneously with the polymerization immediately after initiation of the polymerization. Here, a polymerization conversion rate of an obtained graft copolymer was 95%, and a temperature change amount (ΔT) in a reactor during the continuous addition was 1.2 r.

Subsequently, 0.05 parts by weight of cumene hydroperoxide along with an oxidoreductive catalyst including 0.035 parts by weight of dextrose, 0.06 parts by weight of sodium pyrophosphate, and 0.0015 parts by weight of ferrous sulfate were added batchwise, and additional polymerization was performed for one hour while elevating temperature to 75 r. Here, a polymerization conversion rate of an obtained final graft copolymer was 98.8%, and a total graft rate was 55%.

The obtained final graft copolymer was subjected to atmospheric pressure coagulation by adding 2 parts by weight of magnesium sulfate based on 100 parts by weight of the final graft copolymer (based on a solid), and a powder having a water content of 1% by weight or less was obtained by means of a hot air fluid bed dryer.

Preparation of Thermoplastic Resin Composition 25 parts by weight of the obtained graft copolymer powder, and 75 parts by weight of an α-methyl styrene-acrylonitrile copolymer prepared by solution polymerization (manufactured by LG chemistry, product name: 100UH), along with 1 part by weight of a lubricant and 0.1 parts by weight of a heat stabilizer, were fed into a general mixer and mixed therein, followed by melting and kneading at 200 to 250° C. using an extruder and then pelletizing. Subsequently, a specimen for measuring properties was manufactured by means of an injection machine.

Example 2

An experiment was carried out in the same manner as in Example 1, except that, in the batch input step (S1) to prepare a thermoplastic resin, PBL A was added in an amount of 45 parts by weight instead of 35 parts by weight and PBL B was added in an amount of 10 parts by weight instead of 20 parts by weight.

Example 3

An experiment was carried out in the same manner as in Example 2, except that, in the batch input step (S1) to prepare a thermoplastic resin, an acrylonitrile content in 15 parts by weight of a total of styrene and acrylonitrile monomers was 20% by weight instead of 10% by weight, and, in the continuous addition step (S2), an acrylonitrile content in 30 parts by weight of a total of styrene and acrylonitrile monomers was 27.5% by weight instead of 32.5% by weight.

Example 4

An experiment was carried out in the same manner as in Example 2, except that, in the batch input step (S1) to prepare a thermoplastic resin, PBL B was added in an amount of 15 parts by weight instead of 10 parts by weight, styrene and acrylonitrile monomers was added in a total amount of 10 parts by weight instead of 15 parts by weight, and an acrylonitrile content in the monomers was added in an amount of 20% by weight and, in the continuous addition step (S2), an acrylonitrile content in 30 parts by weight of a total of styrene and acrylonitrile monomers was 26.6% by weight instead of 32.5% by weight.

Comparative Example 1

An experiment was carried out in the same manner as in Example 1, except that, in the batch input step (S1) to prepare a thermoplastic resin, PBL A was not added, PBL B was added in an amount of 55 parts by weight instead of 20 parts by weight, an acrylonitrile content in 15 parts by weight of a total of styrene and acrylonitrile monomers was % by weight instead of 10% by weight, and potassium stearate was added in an amount of 1 part by weight instead of 0.2 parts by weight, tertiary dodecyl mercaptan, as a molecular weight regulator, was added in an amount of 0.35 parts by weight instead of 0.1 parts by weight in a subsequent step, and, in the continuous addition step (S2), an acrylonitrile content in 30 parts by weight of a total of styrene and acrylonitrile monomers was 25% by weight instead of 32.5% by weight and tertiary dodecyl mercaptan was added in an amount of 0.15 parts by weight instead of 0.1 parts by weight.

Comparative Example 2

An experiment was carried out in the same manner as in Example 1, except that, in the batch input step (S1) to prepare a thermoplastic resin, an acrylonitrile content in 15 parts by weight of a total of styrene and acrylonitrile monomers was 25% by weight instead of 10% by weight and, in the continuous addition step (S2), an acrylonitrile content in 30 parts by weight of a total of styrene and acrylonitrile monomers was 25% by weight instead of 32.5% by weight.

Polymerization Characteristics

Addition compositions and polymerization characteristics of Examples 1 to 4 and Comparative Examples 1 and 2 are summarized in Table 1 below.

TABLE 1

| Classification | | Examples | | | | Comparative Examples | |
|---|---|---|---|---|---|---|---|
| | | 1 | 2 | 3 | 4 | 1 | 2 |
| Batch addition (S1) | PBL A | 35 | 45 | 45 | 45 | — | 35 |
| | PBL B | 20 | 10 | 10 | 15 | 55 | 20 |
| | Sum of monomers | 15 | 15 | 15 | 10 | 15 | 15 |
| | Acrylonitrile content in monomers | 10 | 10 | 20 | 20 | 25 | 25 |
| | Molecular weight regulator | 0.1 | 0.1 | 0.1 | 0.1 | 0.35 | 0.1 |
| | Emulsifier | 0.2 | 0.2 | 0.2 | 0.2 | 1.0 | 0.2 |
| | Initiator type | TBHP | TBHP | TBHP | TBHP | TBHP | TBHP |
| Continuous addition (S2) | Sum of monomers | 30 | 30 | 30 | 30 | 30 | 30 |
| | Acrylonitrile content in monomers | 32.5 | 32.5 | 27.5 | 26.6 | 25 | 25 |
| | Molecular weight regulator | 0.1 | 0.1 | 0.1 | 0.1 | 0.15 | 0.1 |
| | Emulsifier | 1.0 | 1.0 | 1.0 | 1.0 | 1.0 | 1.0 |
| | Initiator type | CHP | CHP | CHP | CHP | CHP | CHP |
| Final polymerization conversion rate (%) | | 98.8 | 99.0 | 98.9 | 98.5 | 98.6 | 98.8 |
| Total graft rate (%) | | 55 | 62 | 75 | 55 | 31 | 53 |
| ΔT (° C., max) | | 1.2 | 1.0 | 1.5 | 0.7 | 2.5 | 1.5 |

Test Example

The properties of each of the thermoplastic resin composition specimens according to Examples 1 to 4 and Comparative Examples 1 and 2 were measured. Results are summarized in Table 2 below.

Measurement Methods

Weight-average particle diameter (Å): Measured by means of the NICOMP 380 device, as a submicron particle sizer, manufactured by Particle Sizing Systems (PPS) according to a dynamic light scattering method.

Gel content: A polybutadiene rubber latex was solidified using a dilute acid or metal salt, washed, and dried in 60° C. a vacuum oven for 24 hours. Subsequently, an obtained rubber lump was cut into small pieces with scissors. Subsequently, 1 g of a rubber slice was immersed in 100 g of toluene and stored in a room-temperature dark room for 48 hours, followed by separating into a sol and a gel. The separated sol and gel were respectively dried, and then a gel content was calculated by Mathematical Equation 1 below:

$$\text{Gel content (\% by weight)} = \frac{\text{Weight of insoluble matter (gel)}}{\text{Weight of sample}} \times 100 \quad \text{[Mathematical Equation 1]}$$

Polymerization conversion rate (%): 1.5 g of a graft copolymer latex was dried for 15 minutes in a 150° C. hot air dryer, and then the weight thereof was measured to find a total solid content. A polymerization conversion rate was calculated according to Mathematical Equation 2 below:

$$\text{Polymerization conversion rate (\%)} = \frac{TSC \times (M + W + S)}{100} - S \quad \text{[Mathematical Equation 2]}$$

TSC: Total Solid Content (parts by weight)
M: Content of total of monomers added (parts by weight)
W: Content of water added (parts by weight)
S: Content of emulsifier and other supplementary solid materials added (parts by weight)

Total graft rate (%): 1 g of an obtained powder-type graft copolymer was added to 50 g of acetone and dissolved therein by stirring for 24 hours. A resultant solution was separated by means of a centrifuge under conditions of 20,000 rpm and −20° C., followed by separating a supernatant and drying a precipitate precipitate using a hot air drier for 12 hours. The weight of a resultant precipitate was measured. Using the measured weight, a graft rate was calculated according to Mathematical Equation 3:

$$\text{Graft rate (\%)} = \frac{\text{Weight of grafted monomers (g)}}{\text{Weight of rubber (g)}} \times 100 \quad \text{[Mathematical Equation 3]}$$

Weight of grafted monomers: (Weight of precipitate remaining after sol-gel separation)−(weight of rubber)

Weight of rubber: The theoretical weight of a solid of an added rubbery polymer

Core graft fraction (%): After sol-gel separation, the thickness of an external graft shell of a gel portion was measured using TEM, and a core graft fraction was calculated according to Mathematical Equations 4 and 5 below;

$$\text{Core graft fraction (\%)} = \frac{\text{Total graft rate} - \text{shell graft rate}}{\text{Total graft rate}} \times 100 \quad \text{[Mathematical Equation 4]}$$

$$\text{Shell graft rate (\%)} = \frac{\begin{array}{c}\text{Volume of rubber}\\\text{particles including shell} -\\\text{volume of rubber}\\\text{particles excluding shell}\end{array}}{\begin{array}{c}\text{Volume of rubber}\\\text{particles including shell}\end{array}} \times 100 \quad \text{[Mathematical Equation 5]}$$

Temperature change amount (ΔT) in polymerization reactor: Indicated as a maximum temperature difference between setting temperature of a polymerization reactor and real temperature inside the polymerization reactor.

Impact strength (Notched Izod, kg·cm/cm): Measured using a ¼″ specimen according to a standard measurement method, ASTM D256.

Falling dart impact strength (N): Measured using a specimen according to a standard measurement method, ASTM D3763.

Heat deflection temperature (HDT, ° C.): Measured using a specimen according to a standard measurement method, ASTM D648.

Chemical resistance (min): Five specimens were mounted on a jig with a strain of 1.0%, and then 10 ml of a thinner for summer season having high volatility and a strong crack-inducing property was added to each of the specimens dropwise. A time taken until fracture occurred was measured. An average value of the five measured times was calculated.

Plating adhesion strength (N/m): A square specimen having a size of 10 mm×10 mm×3 mm was manufactured by injection molding. The manufactured specimen was subjected to a washing process, and then an etching process using anhydrous chromic acid-sulfuric acid at 65° C. for 15 minutes, followed by being subjected to palladium adsorption using a palladium tin catalyst. Subsequently, nickel sulfate was applied to the specimen, thereby manufacturing a finally plated specimen.

10 mm scratches were made on front surfaces of three specimens manufactured in the same manner, and plating adhesion strength of each thereof was measured while peeling off by 80 mm in a vertical direction using a pull gage. An average value of three plating adhesion strength values measured was calculated.

TABLE 2

| Classification | Examples | | | | Comparative Examples | |
| --- | --- | --- | --- | --- | --- | --- |
|  | 1 | 2 | 3 | 4 | 1 | 2 |
| Impact strength | 18 | 17 | 18 | 16 | 17 | 18 |
| Falling dart impact strength | 4,480 | 4,560 | 4,800 | 4,400 | 1,800 | 4,200 |
| Heat deflection temperature | 101 | 103 | 102 | 101 | 97 | 100 |
| Chemical resistance | 60 | 70 | 90 | 50 | 13 | 15 |
| Plating adhesion strength | 12.4 | 12.9 | 13.5 | 12.1 | 9.0 | 11.6 |

As shown in Tables 1 and 2, it can be confirmed that, in the cases of Examples 1 to 4 according to the present invention, a total graft rate is increased and all of impact strength, falling dart impact strength, heat deflection temperature, chemical resistance, and plating adhesion strength are superior, whereby both mechanical properties and plating adhesion strength are improved.

On the other hand, it can be confirmed that, in the case of Comparative Example 1 in which a conjugated diene rubbery polymer is used alone, an acrylonitrile content in the monomers graft-polymerized to the core of the conjugated diene rubbery polymer is excessive, and an acrylonitrile content in the monomers constituting and graft-polymerized to the shell is small, a total graft rate is decreased and all of falling dart impact strength, heat deflection temperature, chemical resistance, and plating adhesion strength are very poor.

In addition, it can be confirmed that, also in the case of Comparative Example 2 in which an acrylonitrile content in the monomers graft-polymerized to the core of the conjugated diene rubbery polymer is excessive and an acrylonitrile content in the monomers constituting and graft-polymerized to the shell is small, all of falling dart impact strength, heat deflection temperature, and plating adhesion strength are poor and chemical resistance is very poor.

From these results, the present inventors confirmed that, when a graft rate is maximized by controlling the composition of each of monomers grafted to rubber particles within a predetermined range to prepare a thermoplastic resin, a thermoplastic resin having improved mechanical properties and plating adhesion strength and a thermoplastic resin composition including the thermoplastic resin may be realized.

The invention claimed is:

1. A thermoplastic resin, comprising: a core prepared by graft-polymerizing 40 to 70% by weight of a conjugated diene rubbery polymer with 7.5 to 30% by weight of a total of monomers comprising an aromatic vinyl compound and a vinyl cyanide compound; and a shell enclosing the core and prepared by graft-polymerizing the conjugated diene rubbery polymer with 15 to 45% by weight of a total of monomers comprising an aromatic vinyl compound and a vinyl cyanide compound, wherein the vinyl cyanide compound of the monomers constituting the core is comprised in an amount of 0.01 to 20% by weight based on 100% by weight of a total of the monomers of the core, and the vinyl cyanide compound of the monomers constituting the shell is comprised in an amount of greater than 25% by weight to 90% by weight or less based on 100% by weight of a total of the monomers of the shell, wherein the conjugated diene rubbery polymer is a mixture of a rubbery polymer (A) having a gel content of 60 to 75% by weight and a rubbery polymer (B) having a gel content of 80 to 95% by weight.

2. The thermoplastic resin according to claim 1, wherein the monomers of the core is graft-polymerized to an inside of the conjugated diene rubbery polymer.

3. The thermoplastic resin according to claim 1, wherein 25% by weight of the rubbery polymer (A) has a weight-average particle diameter of 2,400 to 2,800 Å.

4. The thermoplastic resin according to claim 1, wherein 25% by weight of the rubbery polymer (B) has a weight-average particle diameter of 2,500 to 2,900 Å.

5. The thermoplastic resin according to claim 1, wherein a weight ratio of the rubbery polymer (A) to the rubbery polymer (B) is 50:50 to 99.9:0.1.

6. The thermoplastic resin according to claim 1, wherein, in the thermoplastic resin, a total graft rate of the core and shell is 50 to 85%.

7. The thermoplastic resin according to claim 1, wherein the conjugated diene rubbery polymer is prepared by polymerizing one or more selected from the group consisting of 1,3-butadiene, 2-methyl-1,3-butadiene, 2,3-dimethyl-1,3-butadiene, 2-ethyl-1,3-butadiene, 2,3-dimethyl-1,3-butadiene, 1,3-pentadiene, and chloroprene.

8. The thermoplastic resin according to claim 1, wherein the aromatic vinyl compound of the monomers constituting each of the core and shell is one or more selected from the group consisting of styrene, α-methyl styrene, p-methyl styrene, o-ethyl styrene, p-ethyl styrene, and vinyl toluene.

9. The thermoplastic resin according to claim 1, wherein the vinyl cyanide compound of the monomers constituting each of the core and shell is one or more selected from the group consisting of acrylonitrile, methacrylonitrile, and ethacrylonitrile.

10. A thermoplastic resin composition, comprising the thermoplastic resin according to claim 1 and an aromatic vinyl compound-vinyl cyanide compound copolymer.

11. The thermoplastic resin composition according to claim 10, wherein the thermoplastic resin is comprised in an amount of 10 to 50% by weight and the aromatic vinyl compound-vinyl cyanide compound copolymer is comprised in an amount of 50 to 90% by weight.

12. The thermoplastic resin composition according to claim 10, wherein the thermoplastic resin composition has a heat deflection temperature of greater than 100° C.

13. The thermoplastic resin composition according to claim 10, wherein the thermoplastic resin composition has a chemical resistance of 20 min or more.

14. The thermoplastic resin composition according to claim 10, wherein the thermoplastic resin composition has a plating adhesion strength of greater than 11.6 N/m.

* * * * *